United States Patent
Hampton

[11] Patent Number: 5,806,867
[45] Date of Patent: Sep. 15, 1998

[54] BUCKET TROLLEY WITH DETACHABLE EXTENSION HANDLE

[76] Inventor: Matt A. Hampton, 1116-121st Pl. SE., Everett, Wash. 98208

[21] Appl. No.: 404,500

[22] Filed: Mar. 17, 1995

[51] Int. Cl.$^6$ ................ B62B 3/04; B62B 3/10
[52] U.S. Cl. ............. 280/47.34; 280/79.2; 280/79.5
[58] Field of Search .......... 280/47.131, 47.17, 280/47.23, 47.24, 47.26, 47.315, 47.34, 47.36, 47.371, 79.2, 79.5, 2; 403/165, 361

[56] References Cited

U.S. PATENT DOCUMENTS

| | | | |
|---|---|---|---|
| D. 175,262 | 8/1955 | Kousens | D14/3 |
| 1,013,605 | 1/1912 | Lyon | 280/47.16 |
| 2,038,697 | 4/1936 | Winslow | 280/47.34 |
| 2,235,045 | 3/1941 | Ronning | 280/79.2 |
| 2,321,981 | 6/1943 | Bowers | 211/71 |
| 2,531,131 | 11/1950 | Johnson | 280/79.5 |
| 3,031,207 | 4/1962 | Bard | 280/460.1 |
| 3,528,676 | 9/1970 | Marcandalli | 280/79.2 |
| 3,547,458 | 12/1970 | Price | 280/47.34 |
| 3,788,662 | 1/1974 | Rasmussen et al. | 280/79.2 |
| 3,873,119 | 3/1975 | Koch | 280/47.315 |
| 4,222,580 | 9/1980 | Krokonko | 280/47.34 |
| 4,993,726 | 2/1991 | Schumacher et al. | 280/79.2 |
| 5,046,749 | 9/1991 | Owens | 280/79.5 |
| 5,088,751 | 2/1992 | Zint | 280/47.34 |
| 5,180,179 | 1/1993 | Salvucci | 280/79.5 |
| 5,183,280 | 2/1993 | Gresch | 280/79.5 |
| 5,185,992 | 2/1993 | Garcia | 403/361 |
| 5,472,220 | 12/1995 | Stephan | 280/79.5 |
| 5,599,037 | 2/1997 | Spickler | 280/47.26 |

FOREIGN PATENT DOCUMENTS 825781 12/1959 United Kingdom ............... 280/47.26

*Primary Examiner*—Brian L. Johnson
*Assistant Examiner*—Frank Vanaman
*Attorney, Agent, or Firm*—Frank Abramonte

[57] ABSTRACT

A wheeled trolley having a resilient engaging wall for retaining a standard wheeled trolley having a resilient engaging wall for retaining a standard sized bucket containing a load. The trolley includes a set of wheels to permit easy movement over a surface. The bottom of the bucket is disposed between the wheels to provide a low center of gravity to ensure stability. The bucket is retained by a resilient engaging wall such that the trolley is lifted along with the bucket for moving up and down stairs. An adapter is located on the trolley for interchangeably receiving a handle. The handle may alternatively serve as a handle, or an extension of a handle for a tool associated with the use of the trolley.

2 Claims, 4 Drawing Sheets

BUCKET TROLLEY WITH DETACHABLE EXTENSION HANDLE

BACKGROUND OF THE INVENTION

1. Field of the Invention

The present invention relates to the field of wheeled vehicles. More particularly, the invention pertains to wheeled vehicles adapted for mounting a standard sized bucket thereon, for use by individuals involved in painting, plastering, concrete laying, janitorial services and the like.

2. Description of the Prior Art

Currently, in the construction trades buckets are often used to carry a large variety of items. Tools, parts, sand, bricks, concrete, patch, paint and taping mud are just a few of the items routinely carried in buckets. These buckets are filled at one spot, then lifted by a bucket handle and carried by a worker often 100 yards or more to another location. Many of the tools and materials are heavy and, as may be expected, these buckets, which are usually of the standard 5 gallon variety, are most often filled to their tops. A great number of back injuries result from this practice, along with the consequent pain, lost work time, lost wages and worker compensation claims. These back injuries are often permanent and will limit the worker's ability to earn a living for the rest of their life. Additionally, it is difficult to carry a single bucket using one or two hands, so workers often balance the load by carrying a bucket in each hand. This solution however means that worker is more likely to carry a heavier load than is reasonable, thereby adding to the injury potential caused by the current method.

The use of wheeled carts to carry loads is well known. Examples include the following:

U.S. Pat. No. 4,222,580 to Krokonko is for a Refuse Bag Holder Assembly. The Bag Holder comprises a disk shaped base member mounted on wheels, a frusto-conical bag support and a handle. The inner surface of the bag support is tapered and specifically designed to receive a bag, the bag being disposed entirely above the wheels. The handle is pivotally mounted for movement in the vertical plane.

A Garden Cart is disclosed in U.S. Pat. No. 5,088,751 issued to Zint. The Garden Cart comprises a circular flanged frame, mounted on a set of wheels and having a handle. The flanged frame is for supporting and retaining a separate receptacle thereon. The wheels include one wheel that is pivotally mounted to the frame for movement about a vertical axis. The handle is pivotally attached to the pivoted wheel for movement in the vertical plane, whereby the frame may be propelled and steered. The flange is disclosed as having a vertical inner surface, and is disposed between the wheels for maintaining a low center of gravity.

U.S. Pat. No. 2,321,981 issued to Bowers discloses a Scrub-Bucket Assembly. The Assembly comprises: a base member mounted above casters, a bucket support frame having an upstanding flange for receiving the lower portions of the buckets mounted on the base member, and a standard with curved cross-arms for retaining the upper portions of the buckets, also mounted on the base member. The drawings show a downward taper parallel to and adjacent the sides of the buckets.

U.S. Pat. No. 3,031,207 issued to Bard discloses a Twin Bucket Assembly. The bucket assembly includes upright flanges adjacent the sides of the buckets which are supported above a set of casters or wheels. The disclosure suggests the use of a mop disposed in the bucket for propelling and steering the assembly.

A universal joint is disclosed in U.S. Pat. No. 2,038,697 for a Manually Operated Tool issued to Winslow. The handle is mounted for pivotal motion in 1) a vertical plane; and 2) in a horizontal plane, relative to the tool head.

A universal joint is also is disclosed in U.S. Pat. No. 3,547,458 for a Steering Attachment For Swimming Pool Vacuum Head, issued to Price. The universal joint permits the handle of the device to be pivoted in: 1) a vertical plane relative to the vacuum head; and 2) about the longitudinal axis of the handle.

There is a demonstrated need for a device which permits buckets bearing tools and materials to be quickly and easily moved about a work site without causing injury to the worker. Such a device must be stable, yet highly maneuverable, and must be easy to operate, so as to encourage its use over the current brute force method.

SUMMARY OF THE INVENTION

The invention comprises a wheeled trolley having a resilient engaging wall for retaining a standard sized bucket containing a load. The trolley includes a pair of caster mounted wheels to permit easy steering. The bottom of the bucket is disposed between the wheels to provide a low center of gravity, and to ensure a wide wheel base for stabilizing the trolley and the load. The bucket is held in place on the trolley by a resilient engaging wall so that the trolley will be lifted up along with the bucket for moving up and down stairs. An adapter is located on the trolley for interchangeably receiving a handle. The handle may alternatively serve as a handle, or an extension of a handle for a tool associated with the use of the trolley. For example, the trolley may be used by a painter to move a 5 gallon bucket of paint about a work site. The handle may then be used as an extension for a paint roller to allow the painter to reach areas that would otherwise require a ladder. Additionally, the adapter comprises a universal joint to facilitate the steering of the trolley.

A first object of the invention is to provide an apparatus for allowing buckets commonly found at a work site to be moved quickly and easily about the work site.

A second object of the invention is to provide an apparatus that minimizes the amount of lifting required of a worker to prevent fatigue and injury that results from carrying heavy loads about the work site.

A third object of the invention is to provide an apparatus that is highly maneuverable and easy to use.

A fourth object is to provide an apparatus which may be easily lifted with the bucket and the load as one unit for movement up and down stairs or over rough terrain.

A fifth object is to provide an apparatus with a handle that may be quickly and easily interchanged between the apparatus and a tool.

DESCRIPTION OF THE PREFERRED EMBODIMENTS

Figure 1:
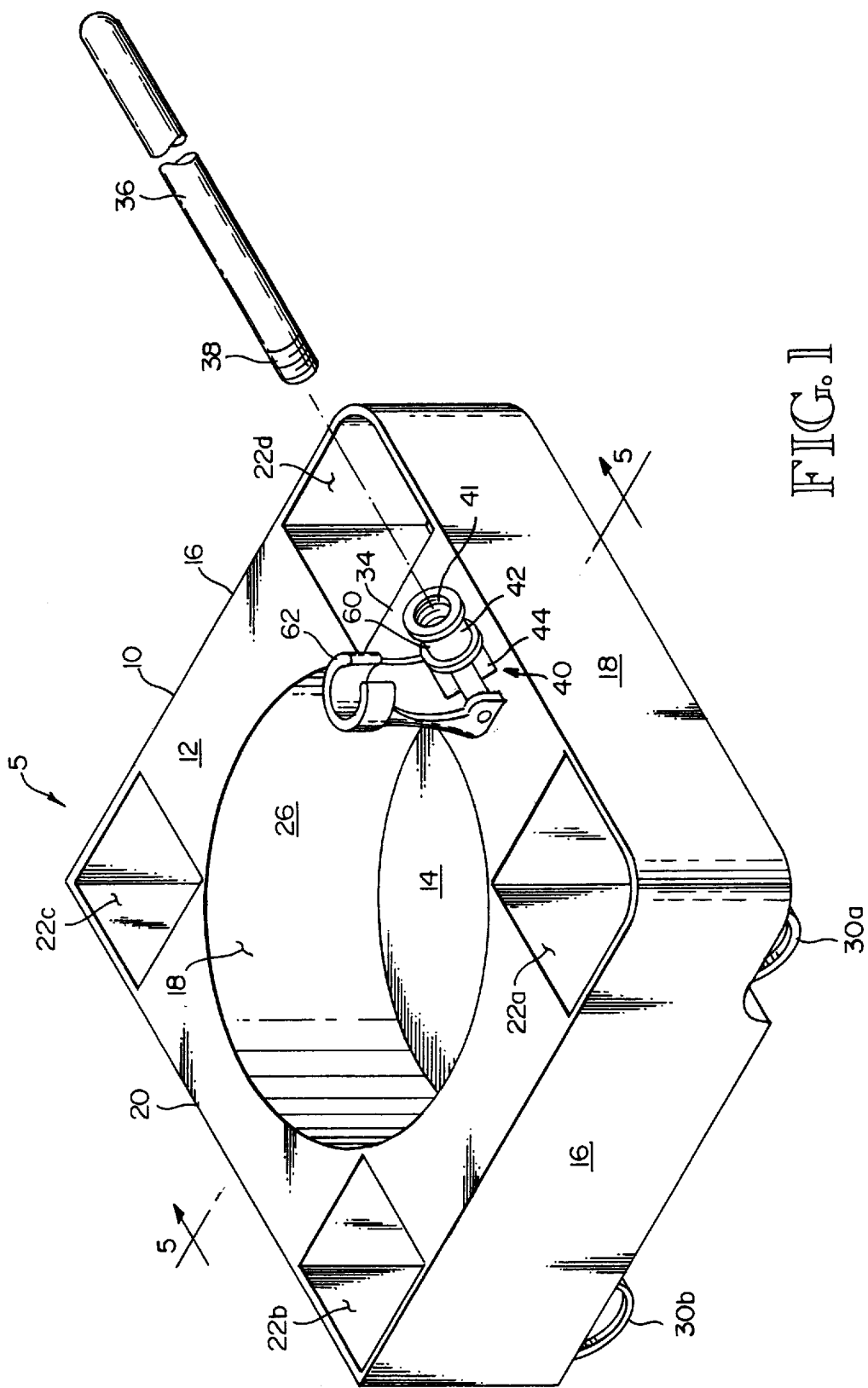
FIG. 1 is a perspective view of the trolley and the handle, the bottom surface of the trolley is solid and the mounting means is a screw type mount.

With reference to FIG. 1, the trolley 5 includes a support frame 10 having a top surface 12 and a bottom surface 14. Side walls 16, a front wall 18, and a rear wall 20 connect the top and the bottom surfaces 12, 14 respectively, about their peripheries. The top surface 12 includes several pockets 22a–d therein for placing items to be carried.

Figure 2:
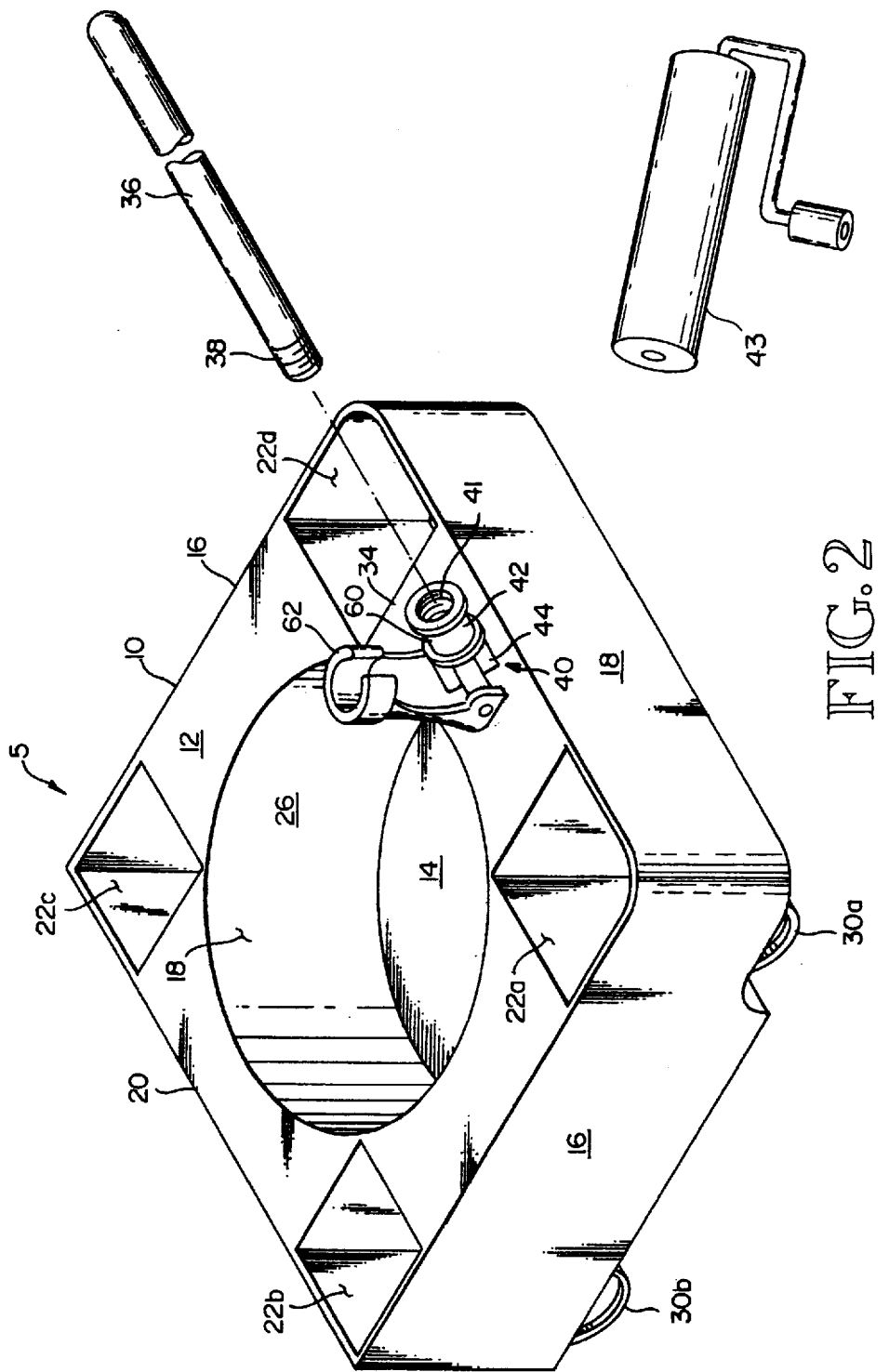
FIG. 2 is a perspective view of the trolley and the handle wherein the bottom surface of the trolley has a bottom surface aperture therethrough.
Figure 5:
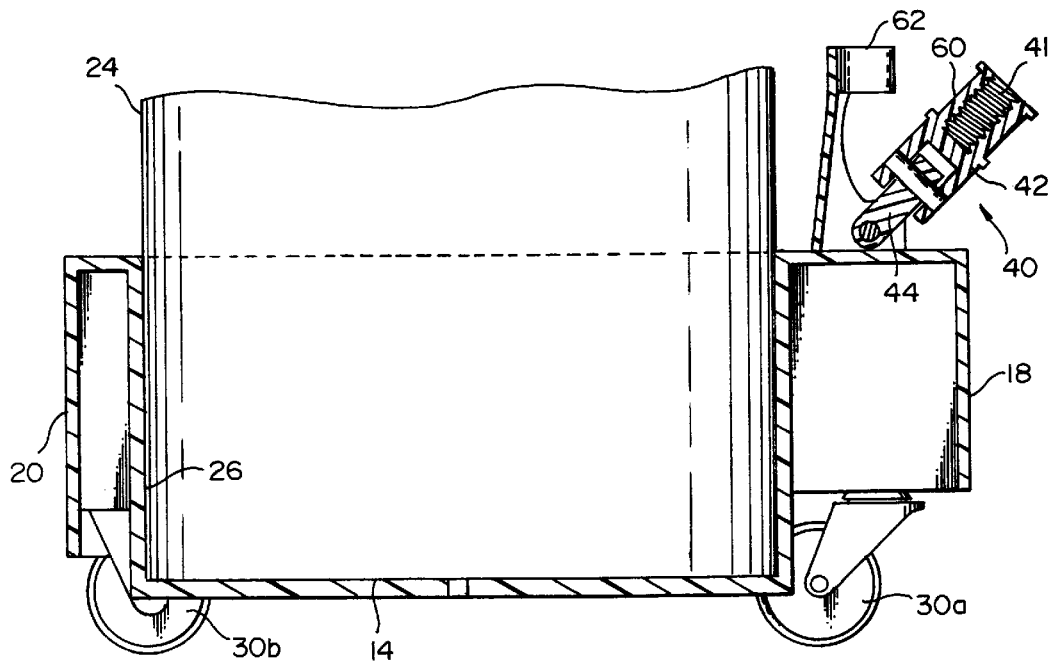
FIG. 5 is a cross section of the trolley of FIG. 1 with a bucket in place, the view taken along the line 5 of FIG. 1.
Figure 6:
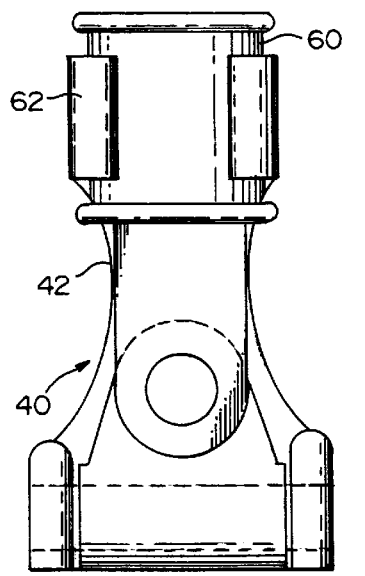
FIG. 6 is a front plan view of the adapter in the upright position, secured in the collar.

With reference to FIGS. 1 and 5, the top surface 12 also includes an aperture 18 therein for receiving a bucket 24 to be carried. An engaging wall 26 is provided extending substantially vertically from the periphery of the aperture 18 downward to the bottom surface 14. The engaging wall 26, as well as the rest of the support frame 10, is composed of a resilient material such as plastic. The radius of the engaging wall 26 is sized such that the compliant engaging wall 26 will securely retain a standard 5 gallon bucket 24 received therein, the engaging wall 26 being slightly displaced outward by the engagement with the slightly tapered side of the loaded bucket 24. A radius of between 10 ⅜ inches and 10 ⅞ inches has been found suitable, this being the approximate radius of the lower portion of the bucket 24. With reference to FIG. 2, the bottom surface 14 may define a second aperture 28, concentric with the aperture in the top surface 12, such that the bucket 24 may extend through the bottom surface 14.

Figure 3:
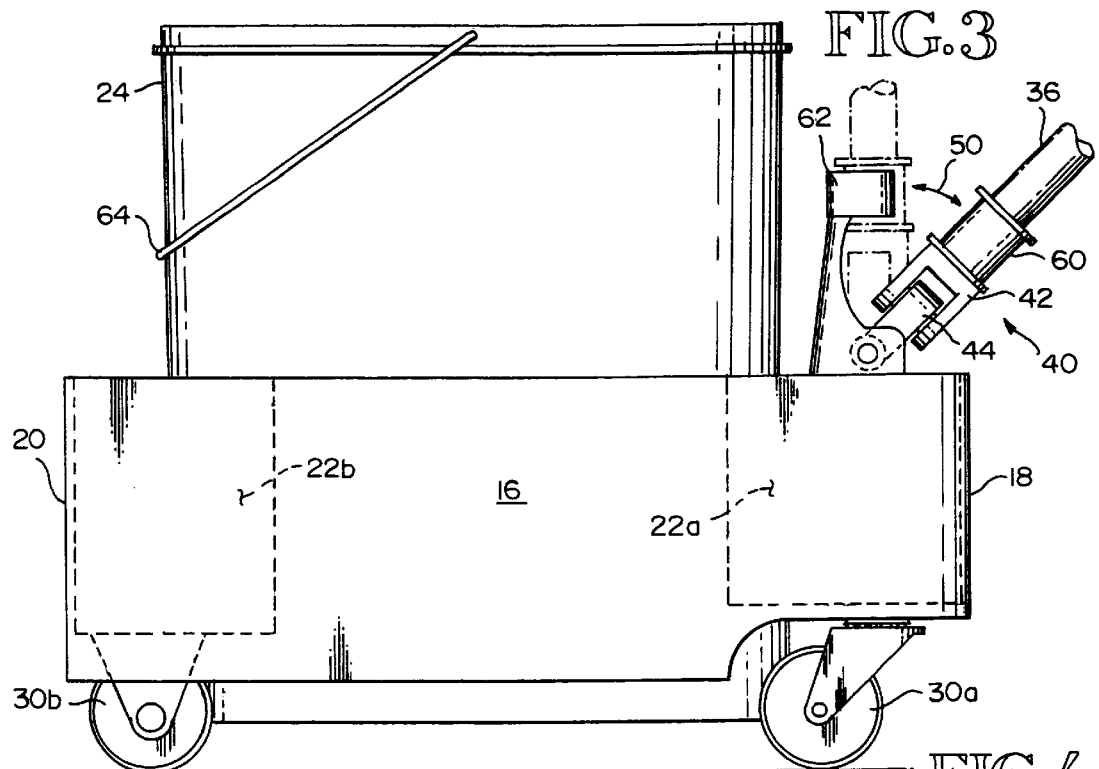
FIG. 3 is a side elevational view of the trolley of FIG. 2 with the handle mounted thereto, the phantom lines showing the adapter in an upright position.
Figure 4:
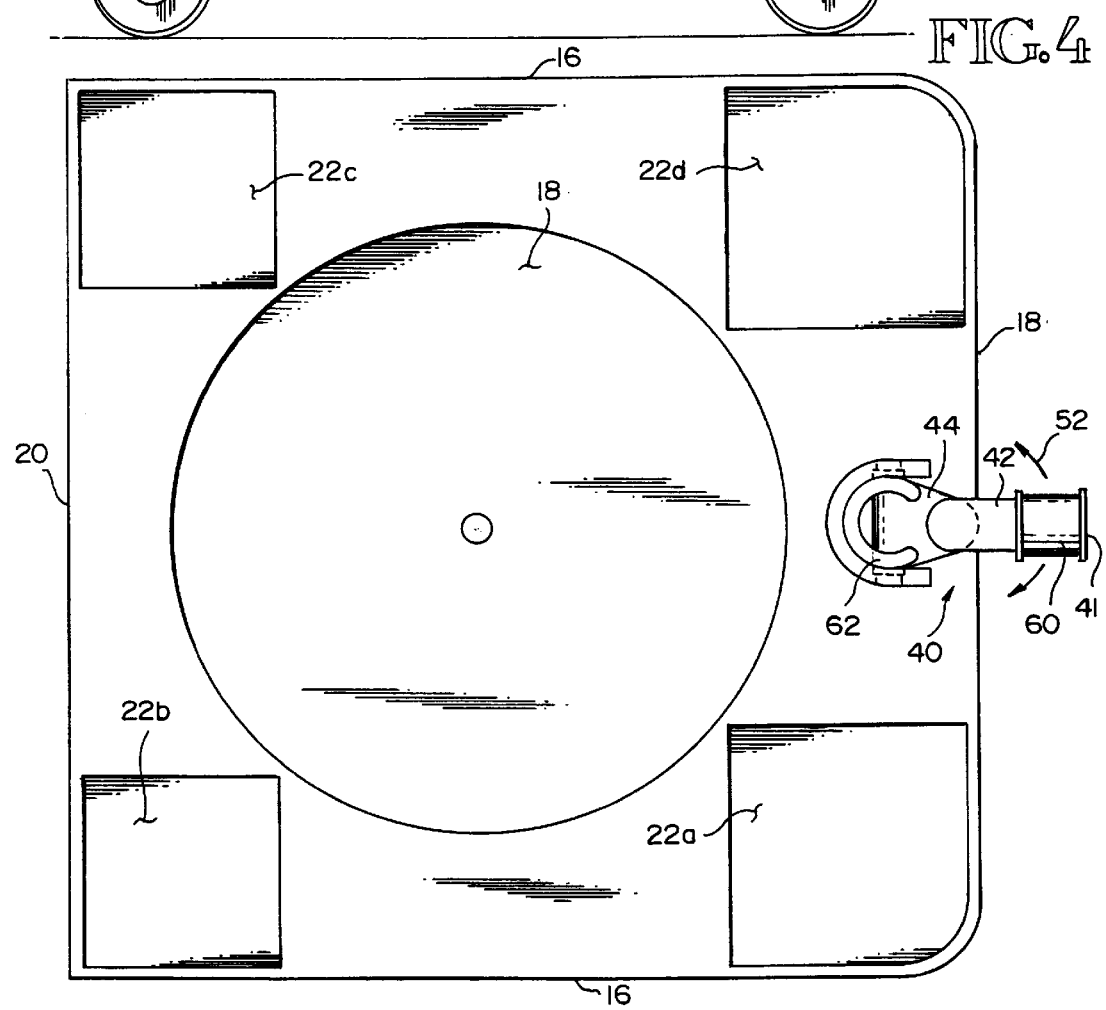
FIG. 4 is top plan view of the trolley.

With reference to FIGS. 3 and 5, a set of wheels 30 are provided on the support frame 10. In the preferred embodiment four wheels 30a–d are mounted to the bottom surface 14 of the support frame 10, for permitting the trolley 5 to be easily wheeled about while supporting the bucket 24. The wheels 30a, 30d proximate the front wall 18 of the support frame 10 are mounted as casters to allow the trolley 5 to be easily steered. A portion of the side walls 16 proximate the front wall 18 may be notched to provide clearance for the front wheels 30a, 30d to turn. The wheels 30a–d are spaced such that the lower portion of the bucket 24 may be carried therebetween. This contributes to the stability of the load in two ways: 1) it ensures that the center of gravity is the lowest that can be achieved; and 2) it also ensures a relatively wide wheel base.

With reference to FIGS. 1–7, means 34 are shown for removably mounting an elongated handle 36 having a first end 38 to the trolley 5. The means 34 include an adapter 40 mounted to the trolley 5. The adapter 40 is formed of an upper adapter section 42 and a lower adapter section 44 which are pivotally mounted to one another, the lower adapter section 44 further being pivotally mounted to the top surface 12 of the support frame 10 such that the adapter 40 forms a universal joint. The universal jointed adapter 40 allows the handle 36 to be pivoted, with respect to the trolley 5, in two planes. The planes are those of the FIGS. 3 and 4, and the movement corresponds to that of the arrows 50, 52 in FIGS. 3 and 4 respectively. The planes are substantially perpendicular to one another. The first end 38 of the handle 36 is adapted for being mounted to the adapter 40.

With particular reference to FIGS. 1 and 5, in one embodiment the first end 38 of the handle 36 is externally threaded for being received within a threaded opening 41 defined in the distal end of the upper adapter section 42. The handle 36 may be easily removed from the trolley 5 and a tool 43 such as a paint brush or roller having a threaded receptacle 44 may be placed on the first end 38 of the handle 36. This provides a convenient handle or extension of a handle for the tool 43. Alternatively, the threaded male member may be on the adapter 40 and the threaded female member may be located on the handle 36 (not shown).

Figure 7:
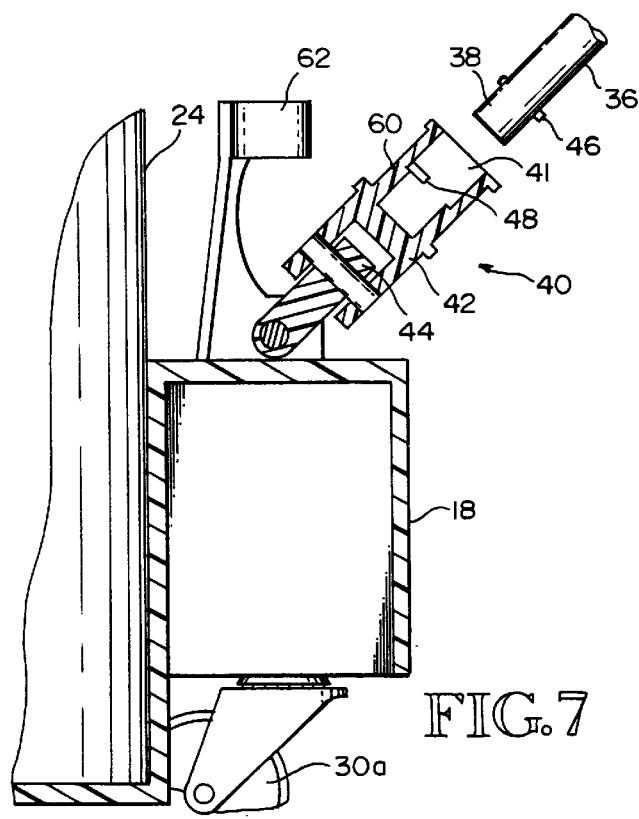
FIG. 7 is a perspective view of the trolley and handle with bayonet mounting means.

With particular reference to FIG. 7, in a second embodiment a bayonet mount replaces the screw mount. A pair ears 46 are provided on either the first end 38 of the handle 36 as shown in FIG. 5, or within opening 41 of the adapter 40 (not shown). An engagement flange 48 is provided on either the adapter 40 within the opening 41 as shown in FIG. 5, or on the first end 38 of the handle 36 (not shown), for securely engaging the ears.

With reference to FIGS. 1–7 the upper adapter section 42 has a neck 60 defined about its periphery. A resilient collar 62 is mounted above the top surface 12 of the support frame 10 for removably engaging the neck 60 of the upper adapter section 42.

With general reference to FIGS. 1–7, in use a loaded 5 gallon bucket 24 is lowered into the aperture 18. The weight of the contents of the bucket 24 will force the bucket 24 downward, the engagement of the bucket 24 with the engaging wall 26 slightly displacing the resilient engaging wall 26 outward, such that the bucket 24 will achieve a securing engagement with the engaging wall 26. The handle 36 may be attached to the trolley 5 by mounting the first end 38 of the handle 36 to the adapter 40. The mounting is facilitated by having the adapter 40 in its upright position, the neck 60 of the adapter 40 securingly received into the collar 62. The trolley 5 may then be wheeled to the desired location, being pushed or pulled by the handle 36. Steering is easily accomplished due to the universal joint formed by the adapter 40 and the caster type mounting of the front wheels 30a, 30d. If faced with a situation in which the trolley 5 may not be easily wheeled, such as a set of stairs, the user may lift the bucket 24 by a bucket handle 64, which will also lift the trolley 5 due to the bucket's 24 securing engagement with the retaining wall 26. Once at the desired location, the elongated handle 36 may be removed from the trolley 5 and attached to a tool 43 by first securing the neck 60 of the adapter 40 in the collar 62, then dismounting the first end 38 of the handle 36 from the adapter 40 and finally mounting the first end 38 of the handle 36 to the tool 43. Alternatively, the handle 36 may be conveniently stored out-of-the-way, by placing the handle 36 in the upright position, the neck 60 of the adapter 40 securingly received in the collar 62.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principals of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the claims which follow.

I claim:

1. A, the phrase-tool and trolley combination, the trolley for supporting and transporting at least one bucket having a tapered side, the trolley comprising:

a support frame having a top surface and a bottom surface opposed to the top surface, an aperture defined in the top surface;

a resilient engaging wall extending between the periphery of the aperture in the top surface and the bottom surface, the engaging wall substantially perpendicular to the top surface for securingly engaging the tapered side of the bucket;

at least two wheels rotatable mounted to the bottom surface of the support frame for rotation with respect thereto;

an elongated handle having a first end and a second end, the first end of the handle being threaded;

means for removably mounting the handle to the tool an adapter mounted to the trolley, the adapter having a threaded opening therein for threadedly engaging the threaded first end of the handle for removably mounting the handle to the trolley; and a collar extending perpendicularly from the top surface of the support frame for removably engaging a necked portion of the adapter.

2. A trolley for supporting and transporting at least one bucket having a tapered side, the trolley comprising:

a support frame having a top surface and a bottom surface opposed to the top surface, an aperture defined in the top surface;

a resilient engaging wall extending between the periphery of the aperture in the top surface and the bottom surface, the engaging wall substantially perpendicular to the top surface for securingly engaging the tapered side of the bucket;

at least two wheels rotatably mounted to the bottom surface of the support frame;

an elongated handle having a first end and a second end;

an adapter having a lower adapter section and an upper adapter section, the lower adapter section pivotally mounted to the support frame, the upper adapter section pivotally mounted the lower adapter section, the upper adapter section having an opening for engagingly receiving the first end of the handle, a neck portion defined on the upper adapter section; and a collar extending perpendicularly from the top surface of the support frame for removably engaging the necked portion of the upper adapter section.

\* \* \* \* \*